Oct. 10, 1933.  C. J. STROSACKER ET AL  1,930,350
METHOD OF MAKING TETRACHLORETHYLENE AND HEXACHLORETHANE
Filed Dec. 4, 1931
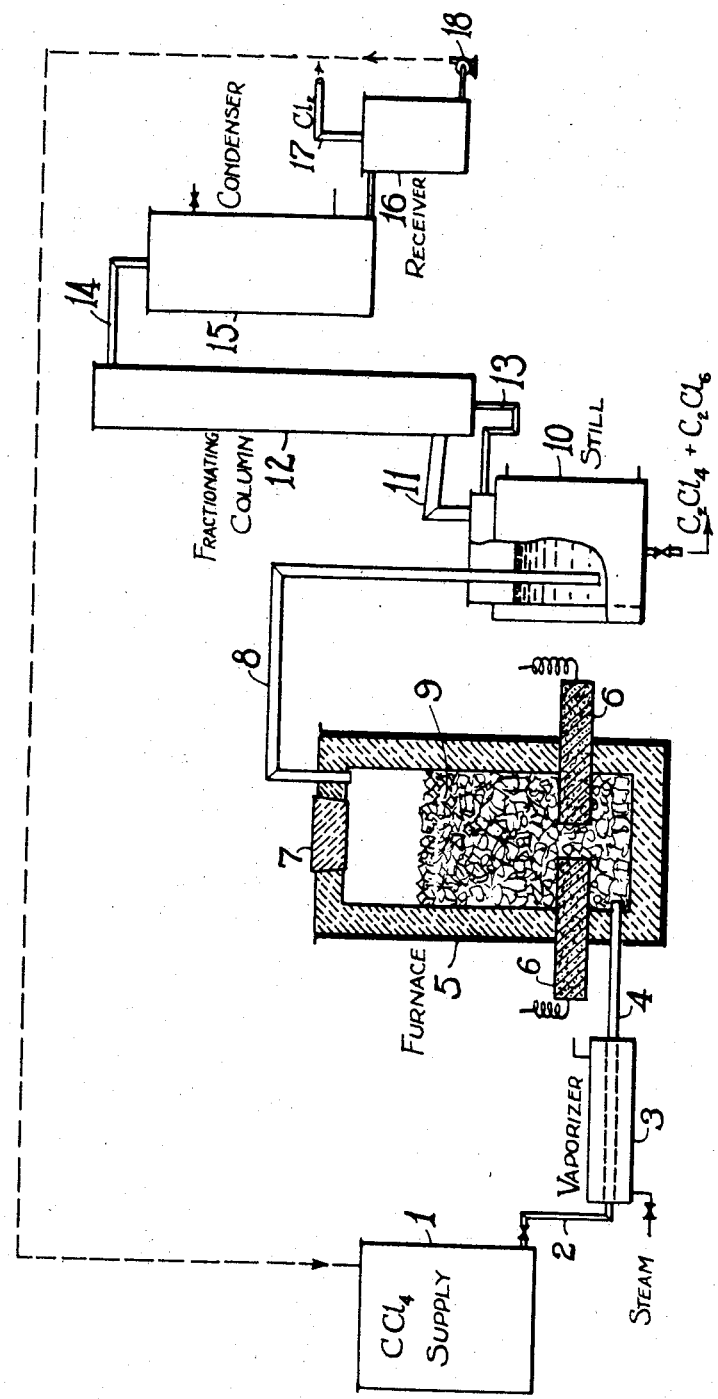
INVENTORS
Charles J. Strosacker and
BY Clarence C. Schwegler
Fay, Oberlin & Fay.
ATTORNEYS Patented Oct. 10, 1933

1,930,350

UNITED STATES PATENT OFFICE 1,930,350

METHOD OF MAKING TETRACHLORETHYLENE AND HEXACHLORETHANE

Charles J. Strosacker and Clarence C. Schwegler, Midland, Mich., assignors to The Dow Chemical Company, Midland, Mich., a corporation of Michigan Application December 4, 1931. Serial No. 579,035

9 Claims. (Cl. 260—166)

The invention relates to methods for making tetrachlorethylene, $C_2Cl_4$, and hexachlorethane, $C_2Cl_6$, by the thermal decomposition of carbon tetrachloride.

It has long been known that tetrachlorethylene and hexachlorethane are formed in varying proportions when vapors of carbon tetrachloride are passed through a quartz tube heated to redness. In general a suitable temperature range is between 600° and 1500° C. The decomposition takes place probably in accordance with one or more of the equations:—

(1) $2CCl_4 \rightarrow C_2Cl_6 + Cl_2$
(2) $2CCl_4 \rightarrow C_2Cl_4 + 2Cl_2$
(3) $C_2Cl_6 \rightarrow C_2Cl_4 + Cl_2$
(4) $C_2Cl_4 + Cl_2 \rightarrow C_2Cl_6$ The proportions of the decomposition products vary with the temperature, lower temperatures within the range given above being favorable to the formation of $C_2Cl_6$, while at higher temperatures $C_2Cl_4$ is formed in predominating amount. To a greater or less extent, equations (3) and (4) above may be regarded as indicating a reversible reaction which proceeds in either direction depending upon the temperature, the mass effect of concentration of various components, and other factors.

The foregoing method has heretofore had little more than theoretical interest, its application having been limited to comparatively small scale laboratory experiments. As a possible commercial method for the large scale production of the compounds in question it has suffered from numerous practical limitations. Owing to the formation of chlorine in the reaction the use of metallic tubes for the cracking has been out of the question, since all the common metals of construction are strongly attacked by chlorine at the temperatures employed. Consequently, the choice has been practically limited to glass or silica tubes which are fragile and liable to softening at the higher temperatures within the range specified. The design of suitable apparatus for large capacity from materials of so easily destructible character, which can be supplied only in tubular units of relatively small size, presents almost insuperable difficulties from an engineering viewpoint. Furthermore, the necessity of supplying heat for effecting the decomposition by transfer through walls of poorly heat-conducting material makes the known method wasteful and uneconomical as regards fuel consumption.

We have now found that the aforementioned difficulties and disadvantages may be entirely eliminated through conducting the cracking operation by contacting the carbon tetrachloride vapors directly with a permeable body of electrically heated resistor material, such as carbon, silicon carbide or the equivalent, at a temperature sufficient to decompose the vapors. The reaction may be carried out in apparatus of large size suitable for quantity production which may be easily and economically constructed, is free from any limitation to the use of small size fragile structural units, and is rugged and adapted for continuous use over long periods of time without breakdown or necessity for repairs. The invention, then, consists in the method hereinafter fully described and particularly pointed out in the claims, the annexed drawing and following description setting forth but a few of the various ways in which the principle of the invention may be used.

In said annexed drawing:—

The single figure shows in diagrammatic manner an arrangement of apparatus suitable for carrying out the method of the invention.

Our improved method, broadly stated, consists in vaporizing carbon tetrachloride, passing the vapors through a body or bed of electrically heated carbon material at a temperature preferably between 600° and 1500° C. and separating tetrachlorethylene and hexachlorethane by condensation from the reaction gases. At the lower temperatures within the range given hexachlorethane is the principal reaction product, whereas the proportion of tetrachlorethylene increases as the reaction temperature is raised. The actual proportions of the two principal products obtained, however, will depend more or less upon the conditions under which the reaction gases and vapors are cooled and collected. Although tetrachlorethylene may be almost the sole product of decomposition at the higher reaction temperatures, on cooling the mixture of gases and vapors formed some chlorination of tetrachlorethylene occurs to form hexachlorethane, in accordance with equation (4) above. The amount of such chlorination may depend somewhat upon the rate of cooling. If desired, it may be increased or promoted by adding a suitable chlorination catalyst to the liquid condensate which is brought into contact with chlorine accompanying the condensing vapors.

One mode of carrying out the method of the invention may be explained by reference to the drawing. Carbon tetrachloride from a supply tank 1 is led through a valve-regulated pipe 2 to a vaporizer 3, the latter consisting conveniently of a steam-jacketed tubular member, in which the carbon tetrachloride is continuously vaporized, and the vapors are conveyed thence by pipe 4 to an electric furnace 5. Furnace 5 consists of a vertical shaft provided with a lining of refractory material, in the lower part of which are inserted two or more horizontal carbon or graphite electrodes 6 connected to a suitable source of electric current. In the top of furnace 5 is a closable charging opening 7, and a vapor pipe 8 leads off the exit vapors and gases from the furnace. A body of carbon resistor material 9 is charged into furnace 5 to fill the same to any desired level above the electrodes 6, such material preferably consisting of coarsely granular pieces or lumps of about ½ inch to 2 inch size, for which purpose broken electrode carbons may serve acceptably.

The vapors of carbon tetrachloride are introduced through pipe 4 into furnace 5 near the bottom thereof, such vapors rising through the heated body of resistor material maintained at a temperature between 600° and 1500° C. by the electric current passed therethrough between the electrodes 6, whereby decomposition of the tetrachloride occurs with formation of tetrachlorethylene and hexachlorethane. The carbon tetrachloride vapors are preferably introduced at such a rate that a portion thereof will pass through the furnace undecomposed. The exit vapors and gases, consisting of a mixture of chlorine, tetrachlorethylene, hexachlorethane and undecomposed carbon tetrachloride, pass off through vapor pipe 8 and are led thence to a steam-jacketed still 10, which is lined with lead or other material resistant to the action of chlorine. Still 10 is preferably maintained at a temperature of about 80° to 85° C., whereby a liquid mixture of tetrachlorethylene and hexachlorethane is condensed while chlorine and vapors of carbon tetrachloride are driven off through exit pipe 11 leading to a fractionating column 12. In the column residual vapors of tetrachlorethylene are condensed and returned to still 10 by return pipe 13. Vapors of carbon tetrachloride mixed with chlorine pass off through vapor pipe 14 from the top of column 12 to a condenser 15 in which carbon tetrachloride is condensed. The condensate flows into a receiver 16, while residual chlorine passes off through exit pipe 17. The carbon tetrachloride from receiver 16 may be returned to supply tank 1 by a pump 18 and suitable pipe connections.

For preparing a product relatively free from impurities, operating temperatures around 800° to 900° C. appear to be most satisfactory. At higher temperatures the product may have a bad odor, due probably to the presence of degradation or condensation products of the desired reaction products, and more or less hexachlorbenzene is also formed as an undesired by-product.

To prepare purified tetrachlorethylene the condensate from still 10 is drawn off and distilled in a separate still until the residue begins to crystallize, the distillate consisting of tetrachlorethylene. The hot residue is then drawn off and allowed to crystallize, the crystals of hexachlorethane so formed being separated by centrifuging or filtering from the mother liquor, and the latter added to a subsequent distillation batch returned to still 10.

In case it is desired to increase the yield of hexachlorethane above that normally obtained under the reaction conditions, a chlorination catalyst, e. g. sulphur chloride, ferric chloride or phosphorus, may be added in relatively small amount to the liquid in still 10, through which liquid the uncondensed gaseous products of the reaction are bubbled. The chlorine in such gaseous products will then react to chlorinate the tetrachlorethylene present and increase the ultimate yield of hexachlorethane in corresponding amount. Such chlorination may be allowed to proceed until hexachlorethane commences to crystallize from the liquid mixture. The latter is then drawn off and allowed to cool, thereby forming a slurry of crystals of hexachlorethane which are separated from the mother liquor by centrifuging or otherwise. The mother liquor, consisting of a saturated solution of hexachlorethane in tetrachlorethylene, is most conveniently disposed of by returning to still 10.

Our improved method or process, as described in the foregoing, is especially advantageous for purposes of large scale production, in that a single electric furnace unit, which is capable of sustained operation over long periods of time without material deterioration, may be made in any dimensions required to produce the desired output. The heat economy is far higher than when externally heated tubes of refractory material are used for the cracking. The carbon resistor material is only consumed in negligible amount, and additional supplies may be introduced, when required, with but a slight interruption of regular operation. As resistor material, instead of carbon, silicon carbide (carborundum) or equivalent material having a suitable electrical resistivity may also be employed.

While it is preferable to vaporize the carbon tetrachloride outside of the electric furnace and to conduct the vapors to the latter, we may introduce the liquid carbon tetrachloride directly into the furnace, wherein vaporization and decomposition will then occur concurrently.

The fractional condensation of the higher boiling point reaction products and separation of the same from undecomposed carbon tetrachloride and gaseous products permits of a simple recovery of the constituents of the reaction product in relatively pure form. The further chlorination of the product by means of the chlorine released in the process to increase the yield of hexachlorethane, when desired, provides for the most economical utilization of such chlorine and a higher yield of hexachlorethane than corresponds to the conditions maintained in the cracking zone without adding any new steps to the general process. On the other hand, if it is desired to convert the hexachlorethane recovered from the product to tetrachlorethylene, this may be accomplished by returning such hexachlorethane to the electric furnace to be further cracked in accordance with equation (3) above. The hexachlorethane may be advantageously introduced into the cracking zone of the furnace as a solution formed by dissolving the same in carbon tetrachloride.

This application is a continuation in part of our prior application Serial No. 175,458, filed March 15, 1927.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. In a method for the thermal decomposition of carbon tetrachloride, the step which consists in contacting carbon tetrachloride vapors with an electrically heated body of resistor material at a temperature sufficient to decompose such vapors to form tetrachlorethylene and hexachlorethane.

2. In a method for the thermal decomposition of carbon tetrachloride, the step which consists in contacting carbon tetrachloride vapors with a body of granular carbon electrically heated to a temperature sufficient to decompose such vapors to form tetrachlorethylene and hexachlorethane.

3. The method of making tetrachlorethylene and hexachlorethane which comprises cracking carbon tetrachloride by contacting the vapors thereof with a body of electrically heated carbon material maintained at a temperature between 600° and 1500° C., and fractionally condensing tetrachlorethylene and hexachlorethane from the reaction product.

4. The method of making tetrachlorethylene and hexachlorethane which comprises vaporizing carbon tetrachloride, passing the vapors in contact with a body of electrically heated carbon material maintained at a temperature between 600° and 1500° C., condensing tetrachlorethylene and hexachlorethane together from the reaction product, then condensing unreacted carbon tetrachloride and returning the latter to the first step.

5. The method of making hexachlorethane which comprises vaporizing carbon tetrachloride, passing the vapors in contact with a body of electrically heated carbon material maintained at a temperature between 600° and 1500° C., cooling the reaction product to about 80°–85° C. to condense tetrachlorethylene and hexachlorethane, adding a chlorination catalyst to such condensate, and bringing the condensate in contact with the uncondensed reaction gases containing chlorine, whereby such tetrachlorethylene is chlorinated at least in part to hexachlorethane.

6. The method of making hexachlorethane which comprises vaporizing carbon tetrachloride, passing the vapors in contact with a body of electrically heated carbon material maintained at a temperature between 600° and 1500° C., cooling the reaction product to about 80°–85° C. to condense tetrachlorethylene and hexachlorethane, adding a chlorination catalyst to such condensate, bringing the condensate in contact with the uncondensed reaction gases containing chlorine, whereby such tetrachlorethylene is chlorinated at least in part to hexachlorethane, condensing unreacted carbon tetrachloride from the residual gaseous products and returning the same to the first step.

7. The method of making tetrachlorethylene which comprises vaporizing carbon tetrachloride, cracking the vapors by contacting the same with a body of granular carbon electrically heated to a temperature between 600° to 1500° C., condensing tetrachlorethylene and hexachlorethane from the reaction product, separating such tetrachlorethylene from such hexachlorethane, and returning the latter to the cracking step.

8. The method of making tetrachlorethylene which comprises contacting carbon tetrachloride vapors with an electrically heated body of granular carbon material at a temperature between about 800° and 900° C., fractionally condensing tetrachlorethylene and hexachlorethane from the reaction product and distilling tetrachlorethylene from such condensate.

9. The method of making tetrachlorethylene which comprises cracking the vapors of carbon tetrachloride by contacting the same with a body of granular carbon electrically heated to a temperature between 600° and 1500° C., condensing tetrachlorethylene and hexachlorethane from the reaction product, separating such tetrachlorethylene from such hexachlorethane, dissolving the latter in carbon tetrachloride and introducing the solution to the cracking step.

CHARLES J. STROSACKER.
CLARENCE C. SCHWEGLER.